United States Patent [19]

Yanagisawa et al.

[11] Patent Number: 5,883,222
[45] Date of Patent: *Mar. 16, 1999

[54] PROCESS FOR PRODUCING POLYHYDROXYCARBOXLIC ACID

[75] Inventors: Norio Yanagisawa; Toshikazu Murayama; Nobuko Tsukazi, all of Yokkaichi; Yorozu Yokomori, Ichihara, all of Japan

[73] Assignee: Kyowa Hakko Kogyo Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 849,389

[22] PCT Filed: Oct. 3, 1996

[86] PCT No.: PCT/JP96/02874

§ 371 Date: Jun. 3, 1997

§ 102(e) Date: Jun. 3, 1997

[87] PCT Pub. No.: WO97/12926

PCT Pub. Date: Apr. 10, 1997

[30] Foreign Application Priority Data

Oct. 4, 1995 [JP] Japan ................................. 7-257529

[51] Int. Cl.$^6$ ..................................................... C08G 63/56
[52] U.S. Cl. ........................... 528/361; 528/354; 528/357
[58] Field of Search ................................... 528/361, 354, 528/357

[56] References Cited

U.S. PATENT DOCUMENTS

| 2,703,316 | 3/1955 | Schneider . | |
|---|---|---|---|
| 3,839,297 | 10/1974 | Wasserman et al. . | |
| 5,136,017 | 8/1992 | Khara et al. | 528/354 |
| 5,316,865 | 5/1994 | Enomoto et al. | 528/361 |

FOREIGN PATENT DOCUMENTS

| 2-69553 | of 1990 | Japan . |
| 4-359014 | of 1992 | Japan . |
| 8-193127 | of 1996 | Japan . |
| 8-73574 | of 1996 | Japan . |

*Primary Examiner*—Duc Troung
*Attorney, Agent, or Firm*—Antonelli, Terry, Stout & Kraus, LLP

[57] ABSTRACT

The present invention provides a process for producing polyhydroxycarboxylic acids having a weight-average molecular weight of 50,000 or above which are excellent as biodegradable plastics by subjecting Lactides to ring-opening polymerization in the presence of an inorganic solid acid catalyst carrying silica and/or a light metal.

11 Claims, No Drawings

PROCESS FOR PRODUCING POLYHYDROXYCARBOXLIC ACID

TECHNICAL FIELD

The present invention relates to a process for producing polyhydroxycarboxylic acids, specifically, those having a weight-average molecular weight of 50,000 or above. Said polyhydroxycarboxylic acids are useful as biodegradable plastics for food-wrapping films, beverage bottles, drug delivery systems, etc.

BACKGROUND ART

Some methods are known as the methods for producing polyhydroxycarboxylic acids of a high molecular weight by the use of Lactides; for example, a method which comprises polymerizing, in the presence of polyvalent heavy metal oxide such as lead oxide, a lactide which is obtained by heating lactic acid (U.S. Pat. No. 2,703,316), a method for producing copolymers of lactic acid and glycolic acid having an average molecular weight of 72,000 by copolymerizing, in the presence of stannous octanoate, a mixture of lactide and glycolide respectively obtained by dehydration condensation of lactic acids and glycolic acid (Japanese Published Examined Patent Application No. 14688/81), and a method for producing polylactic acids having a molecular weight of 100,000 by polymerizing DL-lactide in the presence of stannous octanoate (Japanese Published Unexamined Patent Application No. 69553/90). However, these methods, in which Lactides of high purity are necessary, require purification steps of crude lactides such as recrystallization and distillation, and thus have various problems for industrial utilization due to a number of complicated.

DISCLOSURE OF THE INVENTION

The present invention relates to a process for producing polyhydroxycarboxylic acids, specifically, those having a weight-average molecular weight of 50,000 or above by polymerizing Lactides in the presence of an inorganic solid acid catalyst carrying silica and/or a light metal.

The polyhydroxycarboxylic acids include polymers and copolymers of lactides.

The Lactides include lactide and glycolide. As the Lactides, besides commercially available ones, Lactides which are synthesized from the corresponding hydroxycarboxylic acids such as lactic acid and glycolic acid according to the ordinary method may be used without purification. If necessary, these synthesized Lactides may be used after being purified by recrystallization (Japanese Published Unexamined Patent Application No. 279435/94) and distillation (PCT National Publication No. 503490/95).

The Lactides can be used in combination with lactone. The lactone include γ-butyrolactone and ε-caprolactone. The lactone is preferably used in an amount of 20 wt % (hereinafter % means wt %) or below based on the amount of Lactide.

Among various kinds of inorganic solid acid catalysts, inorganic solid acid catalysts carrying silica and/or a light metal as the constituting component are used in the present invention.

The light metal includes alkali metals such as lithium, sodium, and potassium, and alkaline earth metals such as magnesium and calcium, and aluminum.

An inorganic acid addition salt of the alkali metal and the alkaline earth metal such as carbonates or bicarbonates thereof, hydroxycarboxylates thereof such as lactate or glycolate thereof, an organic acid addition salt of the alkali metal and the alkaline earth metal such as acetates, oxides, or hydroxides thereof may be used as the alkali metal and the alkaline earth metal.

The inorganic solid acid catalyst carrying silica and/or a light metal includes aluminum silicate, zeolite, acid clay, activated clay, bentonite, kaolin, talc, magnesium silicate, aluminum borate, and silicate. Usually, commercially available ones are used.

When the combination of an inorganic solid catalyst and an alkali metal or an alkaline earth metal is employed, an inorganic solid acid catalyst as mentioned above is treated according to the following methods to prepare a catalyst.

(1) An inorganic solid acid catalyst is treated with an aqueous solution of carbonates, bicarbonates or hydroxides of an alkali metal compound catalyst or an alkaline earth metal compound catalyst to obtain an inorganic solid acid catalyst carrying an alkali metal compound catalyst or an alkaline earth metal compound catalyst. The metal elution test is carried out in the same manner as in Example 1 to select those in which metal elution is observed, out of the thus obtained inorganic solid acid catalyst carrying an alkali metal compound catalyst or an alkaline earth metal compound catalyst.

(2) Using an inorganic solid acid catalyst which inherently carries as an alkali metal compound catalyst or an alkaline earth metal compound catalyst, the metal elution test is carried out in the same manner as in Example 1. The inorganic solid acid catalyst in which metal elution is observed does not need the treatment mentioned in (1) and can be used as it is. An example of such catalysts is zeolite.

(3) An inorganic solid acid catalyst is added to a raw material solution together with carbonates, bicarbonates, hydroxycarboxylates, acetates, hydroxides, or oxides of an alkali metal compound catalyst or an alkaline earth metal compound catalyst. Alternatively, carbonates, bicarbonates, hydroxycarboxylates, acetates, hydroxides, or oxides of an alkali metal compound catalyst or an alkaline earth metal compound catalyst is added to a reaction mixture to which an inorganic solid acid catalyst is added.

The alkali metal or the alkaline earth metal is added to a reaction mixture in such an amount that the concentration of the alkali metal or the alkaline earth metal eluted in the reaction mixture becomes 10–10,000 ppm, preferably 100–3,000 ppm.

Mixtures of two or more inorganic solid acid catalysts carrying silica and/or a light metal can also be used in the process of the present invention.

The inorganic solid acid catalyst carrying silica and/or a light metal is used in an amount of 0.03–10%, preferably 0.5–7%, more preferably 1–5% based on the amount of a Lactide in one to several portions.

The inorganic solid acid catalyst carrying silica and/or a light metal to be used in the present invention (hereinafter referred to simply as "the inorganic solid acid catalyst") can be added as it is or as a dispersion in a solvent such as toluene or xylene, at the start of reaction together with the starting materials or in the course of reaction.

The polymerization reaction is carried out at 160°–250° C., preferably 180°–240° C., more preferably 180°–220° C., under reduced pressure of 0.05–40 mmHg, preferably 0.1–25 mmHg, for 5–50 hours, preferably 10–30 hours.

After the reaction was completed, the polymer or copolymer obtained in the molten state is cooled to room temperature to give solidified polyhydroxycarboxylic acid.

The weight-average molecular weight of the polyhydroxycarboxylic acids obtained by the process of the present invention is usually 50,000–300,000, though it varies with the kind and amount of catalysts, reaction temperature, reaction pressure, reaction time, etc.

The obtained polyhydroxycarboxylic acids usually carry 0.03–10% of an inorganic solid acid catalyst, but they can be used as such without the removal of the inorganic solid acid catalyst according to the purpose of use because of their high biodegradability.

For the use in drug delivery systems, polyhydroxycarboxylic acids carrying substantially no inorganic solid acid catalyst are preferable. The polyhydroxycarboxylic acids carrying substantially no inorganic solid acid catalyst (inorganic solid acid catalyst content: less than 0.03%) are obtained by purifying the polyhydroxycarboxylic acids carrying 0.03–10% of an inorganic solid acid catalyst.

Purification can be carried out in the following manner.

A polyhydroxycarboxylic acid carrying an inorganic solid acid catalyst is dissolved in a halogenated hydrocarbon such as chloroform, and the insoluble inorganic solid acid catalyst is removed by filtration. The filtrate is added to a lower alcohol such as isopropanol, and the polyhydroxycarboxylic acid precipitated is separated. For the use of the polyhydroxycarboxylic acids as biodegradable polymers, the polyhydroxycarboxylic acids carrying an inorganic solid acid catalyst or the polyhydroxycarboxylic acids with the inorganic solid acid catalyst used in the present invention or another inorganic solid acid catalyst as a degradation promoter added are usually preferable, though the polyhydroxycarboxylic acids carrying substantially no inorganic solid acid catalyst can also be used as biodegradable polymers.

BEST MODE FOR CARRYING OUT THE INVENTION

Examples and Comparative Examples are shown below.

The weight-average molecular weight of polymers and copolymers was measured in the following manner in Examples and Comparative Examples.

A polymer or copolymer was dissolved in chloroform to prepare a 0.5% solution, and the weight-average molecular weight was measured by gel permeation chromatography (GPC) using standard polystyrene of known molecular weight. As GPC columns, TOSOH G-5000, TOSOH G-3000, and TOSOH G-1000 (TOSOH CORPORATION) connected in series were used, and the measurement was carried out at a temperature of 40° C.

EXAMPLE 1

Lactide (100 g) was put into a 100-ml reaction vessel equipped with a stirrer and a nitrogen-introducing tube, and was molten by heating at 100° C. To the molten lactide was added 2.1 g of synthetic light aluminum silicate (Tomita Pharmaceutical Co., Ltd.) *[1], followed by heating at 150° C. for 3 hours. Then, the pressure was reduced gradually to 20 mmHg over 30 minutes, followed by stirring at 195°±5° C. for one hour. After the pressure was reduced gradually to 1 mmHg over 30 minutes, the mixture was stirred at 195°±5° C. for 7 hours to give lactic acid polymer in the molten state. The product was cooled to room temperature to give 60.30 g of light brown lactic acid polymer. The weight-average molecular weight of this polymer was 81,000.

*[1] To 100 g of lactic acid oligomer was added 2 g of synthetic light aluminum silicate (Tomita Pharmaceutical Co., Ltd.), and the mixture was stirred at 80° C. for 24 hours in an atmosphere of nitrogen. After addition of chloroform with stirring, the resulting mixture was filtered with a filter paper, followed by filtration using a membrane filter (0.1μ). After the filtrate was recognized to be transparent with the naked eyes, the amount of alkali metal and alkaline earth metal eluted into the filtrate (lactic acid oligomer) was determined by ICP (inductively coupled plasma) [device: UOP-1 MARK-II (Kyoto Koken Co., Ltd.)]. The determination revealed that the filtrate contained 490 ppm sodium. The same treatment was carried out on the filtered synthetic aluminum silicate, and no sodium was detected in the filtrate. The same synthetic light aluminum silicate as described above (Tomita Pharmaceutical Co., Ltd.) was used in the following Examples.

EXAMPLE 2

A 90% aqueous solution of lactic acid (430 g) was put into a 500-ml reaction vessel equipped with a stirrer and a nitrogen-introducing tube. After substitution of nitrogen gas was carried out three times, the pressure was reduced to 1 mmHg with stirring and the water generated was removed. Then, the temperature was raised to 150° C. to give 348 g of lactide as a distillate.

The obtained lactide (20 g) was put into a 100-ml reaction vessel, and was molten by heating at 150° C. for three hours with stirring. To the molten lactide was added 0.4 g of synthetic light aluminum silicate (Tomita Pharmaceutical Co., Ltd.), and the temperature was raised to 195°±5° C. Then, the pressure was reduced gradually to 20 mmHg over 30 minutes, and the mixture was subjected to reaction for one hour. After the pressure was reduced gradually to 1 mmHg over 30 minutes, the mixture was stirred at 195°±5° C. for 10 hours to give lactic acid polymer in the molten state. The product was cooled to room temperature to give 14.10 g of white lactic acid polymer. The weight-average molecular weight of this polymer was 102,000.

EXAMPLE 3

The lactide obtained in Example 2 (10 g) and glycolide (10 g) were put into a 100-ml reaction vessel equipped with a stirrer and a nitrogen-introducing tube. After substitution of nitrogen gas was carried out three times, the temperature was raised to 150°±5° C., and the mixture was molten over 3 hours with stirring. To the resulting mixture was added 0.4 g of synthetic light aluminum silicate (Tomita Pharmaceutical Co., Ltd.), and the temperature was raised to 195°±5° C. The pressure was reduced gradually to 20 mmHg over 30 minutes, followed by stirring for 3 hours. After the pressure was reduced gradually to 1 mmHg over 30 minutes, the mixture was stirred at 195°±5° C. for 7 hours to give lactic acid-glycolic acid copolymer in the molten state. The product was cooled to room temperature to give 11.50 g of light brown copolymer. The weight-average molecular weight of this copolymer was 65,000.

EXAMPLE 4

The lactide obtained in Example 2 (19 g) and glycolide (1 g) were put into a 100-ml reaction vessel equipped with a stirrer and a nitrogen-introducing tube. After substitution of nitrogen gas was carried out three times, the mixture was stirred at 150° C. for 3 hours in a stream of nitrogen. To the resulting mixture was added 0.4 g of Baylith 5A [synthetic zeolite (Kurita Water Industries Ltd.) ]*[2], and the temperature was raised to 195°±5° C. The pressure was reduced gradually to 20 mmHg over 30 minutes, followed by stirring for one hour. After the pressure was reduced gradually to 1 mmHg over 30 minutes, the mixture was stirred at 195°±5° C. for 9 hours to give lactic acid-glycolic acid copolymer in the molten state. The product was cooled to room temperature to give 14.64 g of white copolymer. The weight-average molecular weight of this copolymer was 73,000.

*² In the metal elution test carried out in the same manner as in Example 1, 381 ppm of sodium elution was observed.

EXAMPLE 5

The lactide obtained in Example 2 (10 g) and γ-butyrolactone (10 g) were put into a 100-ml reaction vessel equipped with a stirrer and a nitrogen-introducing tube. After substitution of nitrogen gas was carried out three times, the mixture was molten by stirring at 150° C. for 3 hours in a stream of nitrogen. To the resulting mixture was added 0.4 g of synthetic light aluminum silicate (Tomita Pharmaceutical Co., Ltd.), and the temperature was raised to 195°±5° C. The pressure was reduced gradually to 20 mmHg over 30 minutes, followed by stirring at 195°±5° C. for 3 hours. After the pressure was reduced gradually to 1 mmHg over 30 minutes, the mixture was stirred at 195°±5° C. for 7 hours to give lactic acid-butyrolactone copolymer in the molten state. The product was cooled to room temperature to give 14.15 g of light brown copolymer. The weight-average molecular weight of this copolymer was 88,000.

EXAMPLE 6

The lactide obtained in Example 2 (17 g) and ε-caprolactone (3 g) were put into a 100-ml reaction vessel equipped with a stirrer and a nitrogen-introducing tube. After substitution of nitrogen gas was carried out three times, the mixture was molten by stirring at 150° C. for 3 hours in a stream of nitrogen. To the resulting mixture was added 0.4 g of synthetic light aluminum silicate (Tomita Pharmaceutical Co., Ltd.), and the temperature was raised to 195°±5° C. The pressure was reduced gradually to 20 mmHg over 30 minutes, followed by stirring at 195°±5° C. for 3 hours. After the pressure was reduced gradually to 1 mmHg over 30 minutes, the mixture was stirred at 195°±5° C. for 7 hours to give lactic acid-caprolactone copolymer in the molten state. The product was cooled to room temperature to give 12.11 g of light brown copolymer. The weight-average molecular weight of this copolymer was 82,000.

Comparative Example 1

The same procedure as in Example 2 was repeated except that 0.2 g of stannous octanoate was used instead of aluminum silicate to give lactic acid polymer. The weight-average molecular weight of this lactic acid polymer was 14,000.

Comparative Example 2

The same procedure as in Example 2 was repeated except that 2.1 g of lead oxide was used instead of aluminum silicate to give lactic acid polymer. The weight-average molecular weight of this lactic acid polymer was 18,000.

INDUSTRIAL APPLICABILITY

The present invention provides polyhydroxycarboxylic acids having a weight-average molecular weight of 50,000 or above which are useful as biodegradable plastics for food-wrapping films, beverage bottles, drug delivery systems, etc.

We claim:

1. A process for producing a polyhydroxycarboxylic acid, which comprises polymerizing a Lactide in the presence of an inorganic solid acid catalyst in combination with a light metal selected from alkali metals and alkaline earth metals.

2. A process according to claim 1, wherein the Lactide is lactide or glycolide.

3. A process according to claim 1, wherein the light metal is aluminum.

4. A process according to claim 1, wherein the inorganic solid acid catalyst is aluminum silicate, zeolite, acid clay, activated clay, bentonite, kaolin, talc, magnesium silicate, aluminum borate, or silicate.

5. A process according to claim 1, wherein the weight-average molecular weight of the polyhydroxycarboxylic acid is 50,000–300,000.

6. The process according to claim 1, wherein the light metal is selected from the group consisting of lithium, sodium, potassium, magnesium, calcium and aluminum.

7. The process according to claim 1, wherein the lactide is used in combination with a lactone.

8. The process according to claim 7, wherein the lactone is selected from the group consisting of γ-butyrolactone and ε-caprolactone.

9. A process for producing a polyhydroxycarboxylic acid which comprises polymerizing a lactide in the presence of an inorganic solid acid catalyst carrying at least one of silica and a light metal, wherein said inorganic solid acid catalyst carrying at least one of silica and a light metal is prepared by treating said inorganic solid acid catalyst with an aqueous solution of a silica, light metal or addition salt thereof, and allowing said silica, light metal or addition salt thereof to elute in a concentration so as to form said inorganic solid acid catalyst carrying at least one of silica and a light metal.

10. A process for producing a polyhydroxycarboxylic acid which comprises polymerizing a lactide in the presence of an inorganic solid acid catalyst carrying at least one of silica and a light metal, wherein said inorganic solid acid catalyst carrying at least one of silica and a light metal is prepared by adding said inorganic acid catalyst to a solution including an alkali metal compound or alkaline earth metal compound together with at least one compound selected from the group consisting of carbonates, bicarbonates, hydroxycarboxylates, acetates, hydroxides and oxides.

11. A process for producing a polyhydroxycarboxylic acid which comprises polymerizing a lactide in the presence of an inorganic solid acid catalyst carrying at least one of silica and a light metal, wherein said inorganic solid acid catalyst carrying at least one of silica and a light metal is prepared by adding an alkali metal addition salt catalyst or alkaline earth metal addition salt catalyst, wherein the addition salt is selected from the group consisting of carbonates, bicarbonates, hydroxycarboxylates, acetates, hydroxides and oxides, to a reaction mixture comprising an inorganic solid acid catalyst.

* * * * *